United States Patent [19]

Kent

[11] Patent Number: 5,708,461

[45] Date of Patent: Jan. 13, 1998

[54] ACOUSTIC TOUCH POSITION SENSOR USING A LOW-LOSS TRANSPARENT SUBSTRATE

[75] Inventor: Joel Kent, Fremont, Calif.

[73] Assignee: ELO TouchSystems, Inc., Fremont, Calif.

[21] Appl. No.: 377,183

[22] Filed: Jan. 24, 1995

[51] Int. Cl.⁶ ............................................ G09G 5/00
[52] U.S. Cl. .................... 345/177; 345/173; 178/18; 310/313 R
[58] Field of Search ........................... 345/173, 177, 345/174, 175, 176, 178; 178/18, 19; 367/118, 907, 129, 127; 310/313 R, 313 A, 313 B

[56] References Cited

U.S. PATENT DOCUMENTS

| | | | |
|---|---|---|---|
| 4,571,519 | 2/1986 | Kawabata et al. | 310/313 A |
| 4,752,709 | 6/1988 | Fujishima et al. | 310/313 A |
| 5,162,618 | 11/1992 | Knowles | 178/18 |
| 5,243,332 | 9/1993 | Jacobson | 345/179 |

OTHER PUBLICATIONS

A Pressure–Responsive Tough–Input Device; T.J. Knowles; SID 92 Digest; pp. 920–923 (1992).

Published International Application No. PCT/JP93/01028; Publication No. WO94/02911 by K. Toda (Feb. 3, 1994).

*Primary Examiner*—Xiao Wu
*Attorney, Agent, or Firm*—Furgang & Milde, LLP

[57] ABSTRACT

A touch position sensor or "touchscreen" utilizes acoustic waves within a sensor substrate to determine the position of touch. The substrate is made of a transparent material, such as borosilicate glass or a barium glass, which exhibits substantially less acoustic absorption than soda-lime glass.

45 Claims, 5 Drawing Sheets

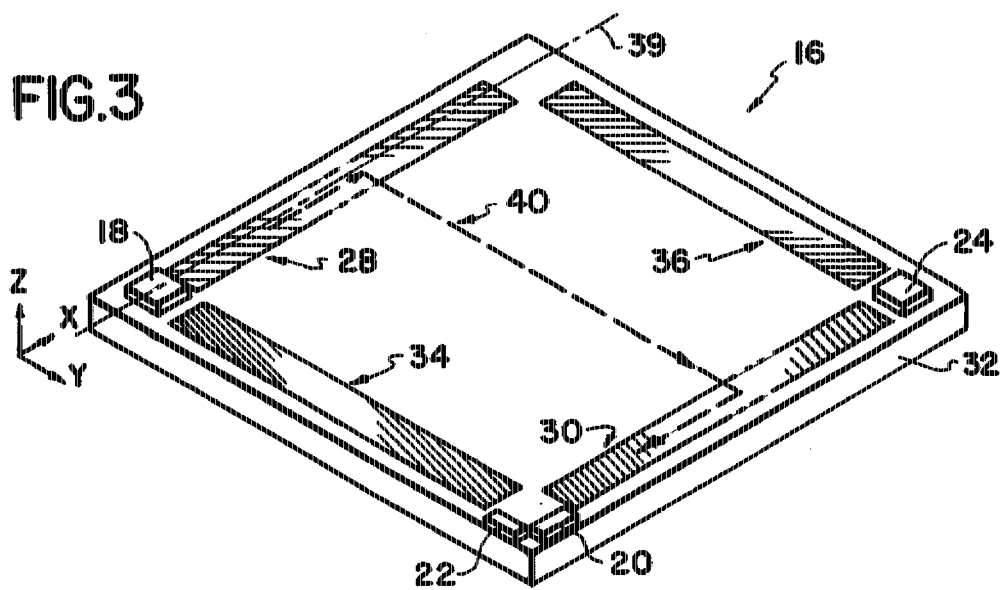
FIG.3
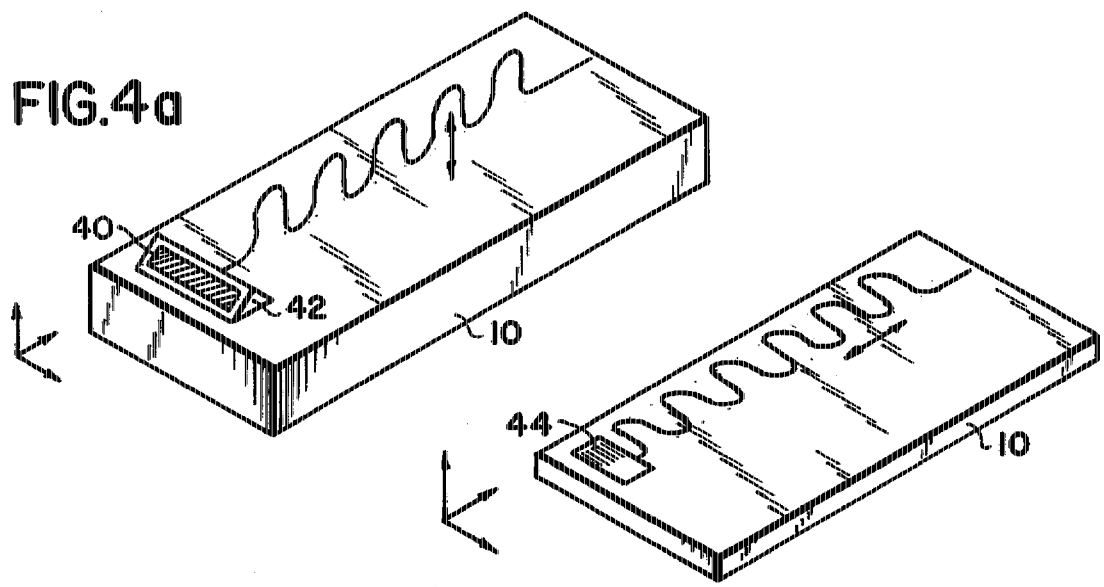
FIG.4a
FIG.4b
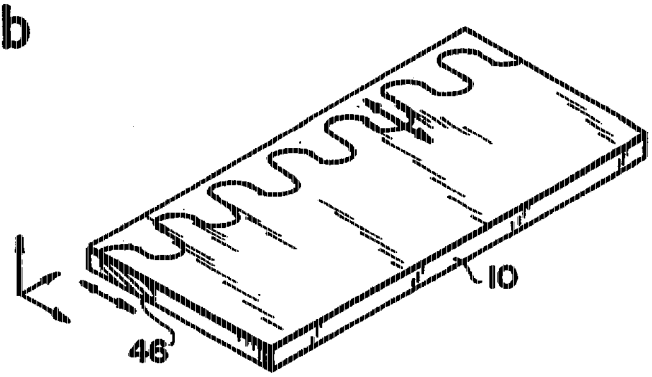
FIG.4c

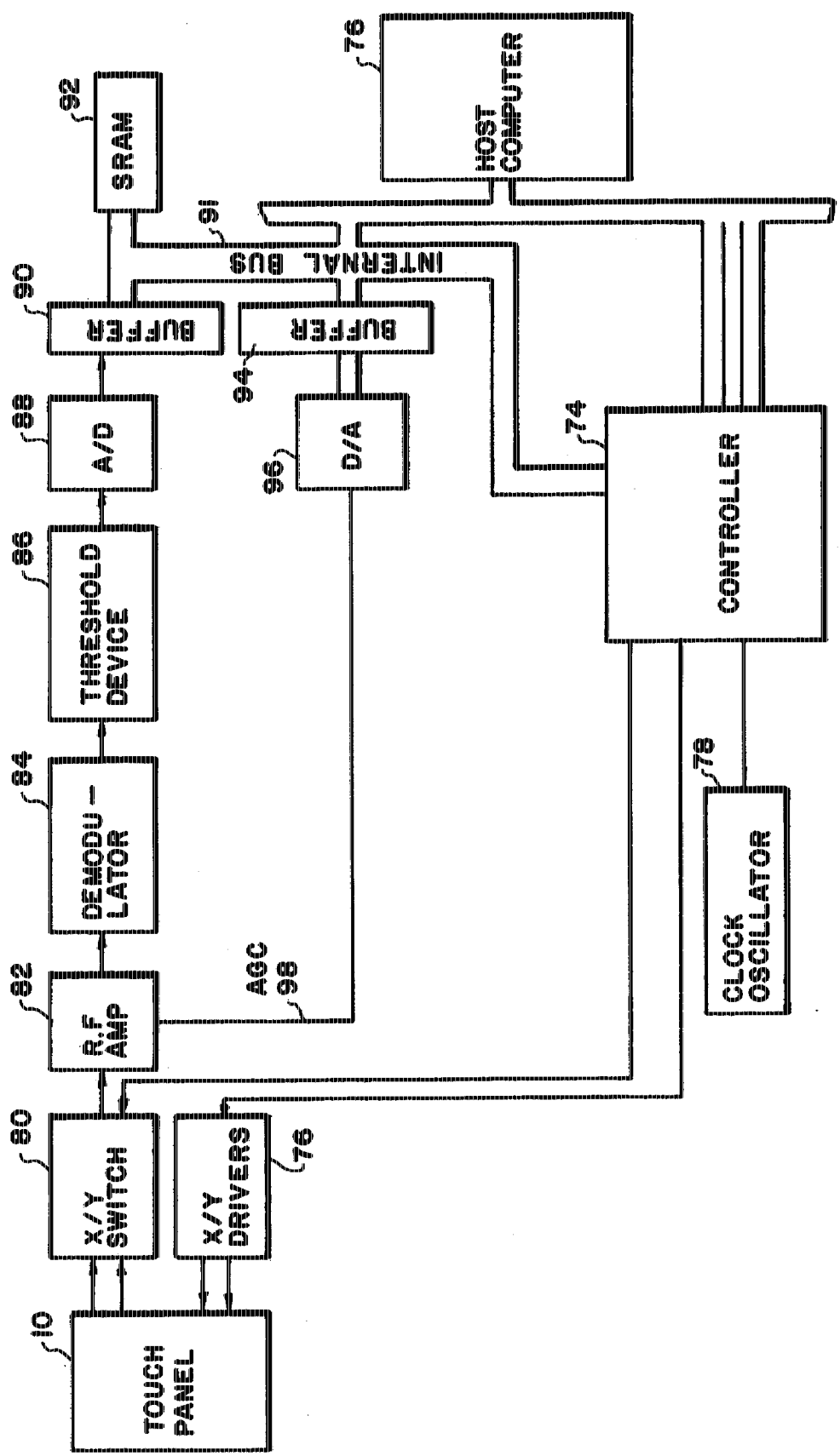

ACOUSTIC TOUCH POSITION SENSOR USING A LOW-LOSS TRANSPARENT SUBSTRATE

TECHNICAL FIELD OF THE INVENTION

The present invention relates to an acoustic touch position sensor and more particularly to a touchscreen the type wherein an acoustic wave is generated within a substrate, the acoustic wave propagating in the substrate along a wavefront having a range of characteristic time delays from a transmitted signal, representing the differing path lengths associated with each axial displacement along an axis of the substrate. A touch on the substrate results in a perturbation of the wave, which is sensed to determine the axial displacement of the touch on the substrate. Touchscreens of this type are used as computer input devices in connection with computer image displays.

BACKGROUND OF THE INVENTION

Acoustic touch position sensors are known to include a touch panel or plate having an array of transmitters positioned along a first edge of a substrate for simultaneously generating parallel acoustic waves, such as surface acoustic waves known as Rayleigh waves, that directionally propagate through the panel to a corresponding array of detectors positioned opposite the first array on a second edge of the substrate. Another pair of arrays is provided at right angles to the first set. Touching the panel at a point causes an attenuation of the waves passing through the point of touch, thus allowing an output from the two sets of arrays indicative of the coordinates of the touch. This type of acoustic touch position sensor is shown in U.S. Pat. No. 3,673,327.

Acoustic touch position sensors are also known wherein a single transducer per axis is provided, which produces a surface acoustic wave which is reflected by a reflective grating at right angles over the length of the grating to produce a surface acoustic wave pattern propagating through an active area of the substrate. The position of a touch in the active area is determined by providing an opposing reflective grating which directs the surface acoustic wave pattern along an axis of the grating toward a receiving transducer system, which records the time of arrival of an attenuation of the wave pattern, which corresponds to a position along the axis of the arrays. The touch may include either a finger or stylus pressing against the surface.

Thus, the wave pattern, dispersed along the axis of the transmitting reflective array, traverses the substrate and is recombined into an axially propagating wave, dispersed in time according to the path taken across the substrate, by another reflective grating, and is directed to a receiving transducer in a direction antiparallel to the transmitted wave, which receives the wave and converts it into an electrical signal for processing. Thus, according to this system, only two transducers per axis are required. Because of the antiparallel path, the time delay of a perturbation of the electrical signal corresponds to a distance travelled by the wave, which in turn is related to the axial distance from the transducer along the reflecting arrays travelled by the wave before entering the active area of the substrate. The location of touch is determined by detecting an attenuated signal as compared to a standard received waveform. Thus, for each axis, a distance may be determined, and with two orthogonal axes, a unique coordinate for the attenuation determined. Acoustic touch position sensors of this type are shown in U.S. Pat. Nos. 4,642,423, 4,644,100, 4,645,870, 4,700,176, 4,746,914 and 4,791,416.

For each axis, a standard signal is provided to the transducer by interfacing a piezoelectric transducer to a surface of the sheet-like member, outside the active area, to produce a wave, propagating along an axis. The reflective array in the path of the wave is a series of spaced surface interruptions, having a separation of an integral number of wavelengths of the wave produced by the transmitting transducer, angled at about 45° to the axis, i.e., the direction of propagation. The reflective array thus produces a reflected a surface acoustic wave propagating at about 90° to the angle of transmission, through the active area of the substrate. Outside the active area, the waves are again reflected by an otherwise identical reflecting array having spaced interruptions at about −45° to the angle of propagation, thereby multiplexing the spatially dispersed signal into a single waveform, propagating antiparallel to the transmitted surface acoustic wave, which is detected by another transducer. The excitation frequency is generally around 5 MHz, and the thickness of the sheet-like member, formed of soda lime glass, is typically in the range from 0.090" to 0.125".

Alternately, the acoustic wave may be reflected off an edge of the substrate parallel to the axis of the transmission reflective grating and reflected back through the substrate to the reflective array and retrace its path back to the transducer. The transducer, in this case, is configured to act as both transmitter and receiver at appropriate time periods. A second transducer, reflective array and reflective edge are provided for an axis at right angles to allow determination of both coordinates of touch. Still another system provides for a single transducer which produces a wave for detecting touch on two axes and also receives the wave from both axes.

Adler, U.S. Pat. No. Re. 33,151, relates to a touch-sensitive system for determining a position of a touch along an axis on a surface. A surface acoustic wave (SAW) generator is coupled to a sheet-like substrate to generate a burst of waves, which are deflected into an active region of the system by an array of wave redirecting gratings. Surface acoustic waves traversing the active region are, in turn, redirected along an axis by gratings to an output transducer. The redirecting gratings are oriented at 45° to the axis of propagation. A location of touch is determined by analyzing a selective attenuation of the received waveform in the time domain, each characteristic delay corresponding to a locus on the surface. The grating elements are placed at a 45° angle and spaced at integral multiples of the SAW wavelength with dropped elements to produce an approximately constant SAW power density over the active area. Thus the spacing between grates decreases with increasing distance along the axis of propagation from the transducer, with a minimum spacing of one wavelength of the transmitted wave. U.S. Pat. Nos. 5,329,070 5,260,521, 5,234,148, 5,177, 327, 5,162,618 and 5,072,427 propose, for various types of acoustic waves, providing reflecting elements which vary in height to control a ratio of reflected wave power to unreflected wave power.

Brenner et al., U.S. Pat. No. 4,644,100 relates to a touch sensitive system employing surface acoustic waves, responsive to both the location and magnitude of a perturbation of the SAW. The system according to this patent is similar in execution to the system according to the U.S. Pat. No. Re. 33,151, while determining an amplitude of a received wave and comparing it to a stored reference profile.

Theoretically, "Rayleigh" waves exist only in an infinitely thick medium. Waves in a uniform, non-piezoelectric medium of finite thickness that are essentially confined to a single surface are more precisely termed "quasi-Rayleigh"

waves although such waves are generally referred to as Rayleigh waves and will be so denominated herein. Given a long enough propagating path in a medium of finite thickness, Rayleigh-type wave energy will not be confined at or near a single surface, but will transfer back and forth between the outer surfaces of the plate. This is because, although small, wave energy components extend through the material thickness, consisting of at least a symmetric and antisymmetric waveform, each of which travels at a slightly different phase velocity, thus causing constructive and destructive interference at various spaced loci on the surfaces of the substrate. Areas of low surface wave energy are insensitive to perturbing influences, e.g. touch. Although areas of relatively high surface energy may be overly sensitive to artifacts, the principal objective with acoustic touch sensors is to provide sufficient wave energy to permit reliable and robust operation.

Acoustic sensors, as disclosed in the aforementioned U.S. Pat. Nos. 4,644,100, 4,700,176 and Re. 33,151, make clever use of reflective arrays to minimize the number of transducers and electronic channels, and to provide a reliable and accurate time-based analog measurement of touch position. However, the resulting relatively long acoustic path lengths, along with the losses from two acoustic scatters, leads to small received signal amplitudes. With such small amplitudes it is difficult to assure a sufficient signal-to-noise ratio for reliable signal processing in a touch sensor of the type which transmits surface acoustic waves (in particular, Rayleigh waves) on a substrate.

SUMMARY OF THE INVENTION

It is a principal object of the present invention to increase the signal to noise ratio in an acoustic touch position sensor or "touchscreen" which employs Rayleigh waves.

It is a further object of the present invention to provide an acoustic touch position sensor of the type disclosed in the U.S. Pat. No. Re. 33,151 which is more reliable and robust than such touch position sensors known heretofore.

It is a further object of the present invention to provide an acoustic touch position sensor of the type described above which employs a low cost electronic controller.

It is a further of the present invention to provide an acoustic touch position sensor of the type described above which utilizes low cost transducers.

It is a further object of the present invention to provide an acoustic touch position sensor of the type described above which permits the use of seals having significant acoustic absorption.

It is a further object present invention to provide an acoustic touch position sensor of the type described above which has extremely narrow arrays for reflecting surface acoustic waves.

It is a still further object of the present invention to provide a touch position sensor of the type described above with transducers which can be constructed with a reduced mechanical profile at the expense of signal loss.

These objects, as well as other objects which will become apparent from the discussion that follows, are achieved, in accordance with the present invention, by providing an acoustic touch position sensor of the type described above with a substrate made of a transparent material, such as borosilicate glass, and/or barium glass, which exhibits substantially less acoustic absorption than conventional soda-lime glass.

It has been discovered, quite unexpectedly, that the use of borosilicate glass as a substrate for acoustic touch position sensors that employ Rayleigh waves adds between 10 and 30 dB to the signal to noise ratio as compared to equivalent acoustic touch position sensors using soda-lime glass as the substrate.

On a tonnage basis, the vast bulk of glass produced in the world is soda-lime glass. For example, "window pane" glass is soda-lime glass. Car windows and mirrors are made with soda-lime glass. Being the lowest cost glass material, soda-lime glass is the natural choice for a transparent substrate material. Consequently, all acoustic touch position sensors known to date have been based on a glass substrate formed of soda-lime glass.

Borosilicate glass was originally developed by Dow Corning and marketed by Corning under the brand name "Pyrex". This glass, although somewhat more expensive than soda-lime glass, has found a mass market mainly due to its small coefficient of thermal expansion which enables it to endure large temperature gradients without cracking. Schott Glass also presently markets a borosilicate glass under the brand name "Tempax".

In a simple experiment, it has been demonstrated that borosilicate glass is approximately one half as absorptive to Rayleigh waves as soda-lime glass. FIG. 1 illustrates the measurement method used to determine Rayleigh wave attenuation in glass. A transmit and receive transducer pair 2 and 4, respectively, was placed on the glass and the distance was varied between two inches, four inches and six inches. Measurements were taken with two samples of soda-lime glass and two samples of borosilicate glass at each of the distances. In this case the borosilicate glass was a sheet of Tempax manufactured by Schott. The results are illustrated graphically in FIG. 2.

As may be seen in FIG. 2, the attenuation in the soda-lime glass was approximately twice the attenuation measured for the borosilicate glass. The soda-lime glass exhibited an attenuation of 1.44 dB per inch; the borosilicate glass attenuated the same signal by 0.74 dB per inch.

Relative to soda-lime glass, this data implies 0.70 dB of additional signal per inch of acoustic path. For a maximum acoustic path length of twenty to forty inches, this implies 14 to 28 dB of additional signal.

Follow-up measurements were made with Schott "Borofloat" glass and soda-lime glass from a variety of sources. The results support the discovery of the advantage of borosilicate over soda-lime glass.

In other experiments, it has also been demonstrated that at least some barium glasses share the low acoustic loss characteristics of borosilicate glass. An example of a barium glass is the structural element of the faceplate used in the manufacture of the Zenith 1490 FTM (flat tension mask) monitor. Samples measured were observed to have an acoustic attenuation of approximately 0.6 dB/inch.

Use of a low-loss glass in a touch position sensor according to the invention thus provides an extra measure of signal "budget" due to the increased signal to noise ratio. This increased budget makes it possible to achieve may objectives that, at least superficially, appear to be unrelated to the choice of substrate material. These are enumerated below:

(1) The increased signal to noise ratio makes it possible to reduce the cost of the electronic controller associated with the touchscreen. In particular, the burst circuit of the controller, which sends a tone burst to the touchscreen transmitting transducers, may be simplified by reducing the burst amplitude to transistor-transistor logic (TTL) voltage levels, making it possible to use TTL circuits at the output stage. Reducing the burst amplitude also has the advantage of reducing EMI emissions from the controller.

(2) Acoustic sensors of the type disclosed in the U.S. Pat. No. Re. 33,151 use reflective arrays to minimize the number of transducers and electronic channels and to provide a reliable and accurate time-based analog measurement of touch position. However, the resulting relatively long acoustic wave path lengths, along with the losses from two acoustic wave scatters, leads to small received signal amplitudes and limits the overall size of the touchscreen. An increase in the signal to noise ratio, resulting from the use of borosilicate glass, makes it possible to (1) reduce the width of the reflective arrays (thus leaving a larger touch area) and (2) increase the overall size of this type of touchscreen. For example, rectangular touchscreens may have a diagonal dimension of at least twenty-one inches.

(3) It is usually necessary to provide contact between the touch sensitive screen and the adjacent objects—for example, a CRT screen and/or a CRT housing. Such contact is effected by means of a resilient seal, such as an RTV seal, between the touchscreen substrate and the adjacent object. Such seals absorb acoustic wave energy, making it highly desirable to increase the signal to noise ratio.

While it is possible to substantially reduce the absorption of Rayliegh waves, over the absorption characteristic of soda-lime glass, by using other materials such as aluminum, other characteristics such as durability, scratch resistance and optical clarity point to the use of a glass as the substrate of choice. As noted above, boronsilicate or "borosilicate" glass and barium glass fulfill these mechanical and optical objectives for a touchscreen while, at the same time, increasing the signal to noise ratio. This is true no matter what type of acoustic waves, or wave modes are involved. For example, Rayleigh waves, Lamb waves and/or shear waves may be caused to propagate in a borosilicate or barium glass substrate. The experiments referred to above show a pronounced improvement over soda-lime glass for Rayleigh waves.

For a full understanding of the present invention, reference should now be made to the following detailed description of the preferred embodiments of the invention as illustrated in the accompanying drawings.

BRIEF DESCRIPTION OF THE DRAWINGS

FIG. 3 is a perspective view of a touchscreen comprising a substrate, transmitting and receiving transducers and four linear arrays of reflective elements.

FIG. 4a is a perspective view of a section of substrate with a wedge type transmitting transducer for acoustic waves.

FIG. 4b is a perspective view of a section of substrate with a surface type transmitting transducer for acoustic waves.

FIG. 4c is a perspective view of a section of substrate with an edge type transmitting transducer for acoustic waves.

FIG. 6 is a block diagram of an electronic circuit for the touchscreen illustrated in FIG. 5.

DESCRIPTION OF THE PREFERRED EMBODIMENTS

Figure 1:
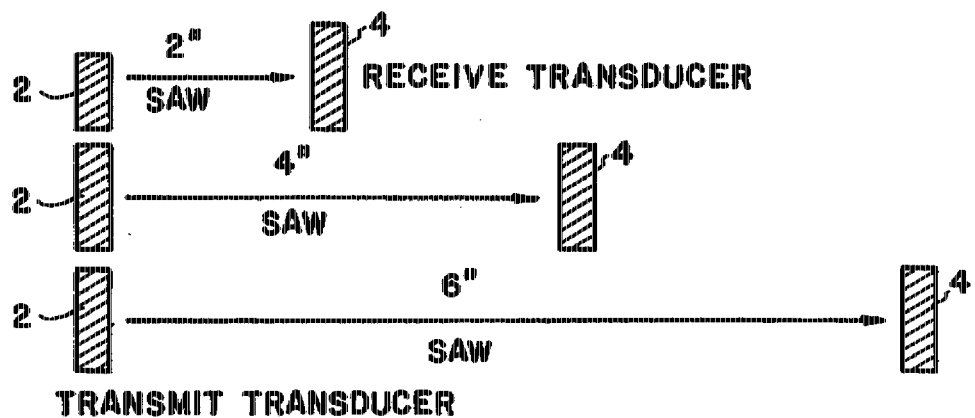
FIG. 1 is a diagram illustrating a method for measuring attenuation of acoustic waves in a substrate.

The preferred embodiments of the present invention will now be described with reference to FIGS. 1–10 of the drawings. Identical elements in the various figures are designated with the same reference numerals.

Figure 2:
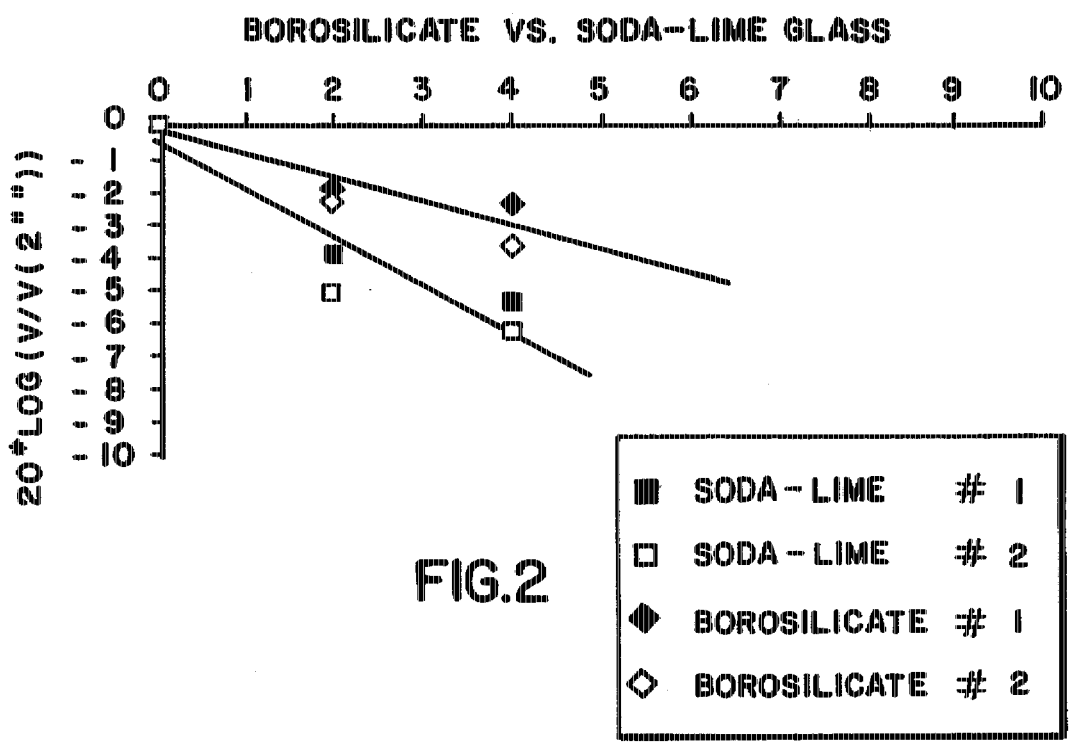
FIG. 2 is a graph of actual results of measurements, using the method illustrated in FIG. 1, for a soda-lime glass substrate and a borosilicate glass substrate.

FIGS. 1 and 2 have been discussed above in connection with a comparison of boron-silicate (borosilicate) glass and conventional soda-lime glass. Tests were conducted using piezo-electric transmitting transducers and receiving transducers mounted on sheets of soda-lime glass and borosilicate glass at different distances to measure the acoustic wave energy attenuation. As shown in FIG. 1, the transmit and receive transducers 2 and 4, respectively, were spaced two inches, four inches and six inches apart. Two sheets of soda-lime glass (soda-lime No. 1 and soda-lime No. 2) and two sheets of borosilicate glass (borosilicate No. 1 and borosilicate No. 2) were tested. The borosilicate glass was manufactured by Schott Glass Co. under the trademark "Tempax".

The data clearly reveals that acoustic waves are subject to approximately fifty percent less attenuation in borosilicate than in soda-lime glass. The average attenuation for the borosilicate glass was 0.74 dB/inch, whereas the average attenuation for soda-lime glass was 1.44 dB/inch.

The present invention contemplates the use of borosilicate glass in an a touch position sensor using surface acoustic waves (in particular, Rayleigh waves) to add between 10 and 30 dB to the signal to noise ratio and hence to enable a variety of product enhancements. The invention also contemplates the use of other transparent materials as an acoustic sensor substrate, provided that such materials have substantially less acoustic absorption than soda-lime glass for Rayliegh waves.

As an example, it has been shown that some barium glasses exhibit an extremely low acoustic loss for Rayliegh waves. An advantage of barium glass is that it is often used as the structural element of CRT faceplates, although such faceplates are normally provided with a soda-lime glass overlay optically bonded onto the barium glass faceplate. If the soda-lime overlay is omitted, the CRT faceplate itself may be used as an acoustic touch position sensor. In this case, the use of the barium glass can add between 12.5 and 37 dB to the signal to noise ratio.

Acoustic waves lose intensity as they propagate through the glass substrate of a touchscreen. This physical effect, the attenuation of acoustic energy by the substrate, is a key factor in determining the signal amplitudes for an acoustic touchscreen system.

Two key parameters determine the signal loss due to this physical effect: (1) how strongly the substrate damps acoustic energy; and (2) how far in distance the acoustic energy must travel in the substrate (or, equivalently, how long in time the energy remains in the substrate). The acoustic attenuation of the substrate material can be specified in units of dB/inch. The relevant distance of travel for the acoustic energy is the maximum acoustic path length within the sensor substrate.

A touch position sensor 16 in accordance with the preferred embodiment of the present invention is shown in FIG. 3 having a pair of transmitting and receiving transducers 18, 22 and 24, 20 associated with each axis for which a coordinate is desired to be determined. Although the touch position sensor 16 has four transducers 18, 22 and 24, 20 respectively associated with the X axis and Y axis so that both X and Y coordinates of a touch may be determined, if only a single coordinate is desired, for example a coordinate along the X axis, then the transducers 24 and 20 associated with the Y axis may be eliminated. The transducers are mounted in standard manner.

The transmitting transducer 18 imparts a Raliegh wave that travels along the X axis to an array 28 of reflective elements having a central axis 39 aligned with the axis of wave propagation. Each element of the reflective array 28 is disposed at angle selected so as to direct a particular acoustic wave across the substrate at a selected orientation. This angle is preferably about 45° with respect to the X axis. The reflected acoustic wave then propagates in the Y direction to a corresponding reflective element disposed in a reflective array 30. The array 30 of reflective elements is disposed along an axis that is parallel to the axis along which the reflective array 28 is disposed. Each of the reflective elements in the array 30 is disposed at a like angle to the first array, e.g., at about 45° with respect to the X axis. The acoustic waves propagating in the Y direction from the reflective array 28 are thus directed along the X axis to the receiving transducer 22. The receiving transducer mounted in conventional manner, e.g., to the top side of the substrate 10, perpendicular to the axis of the array 30 so as to sense the energy reflected thereby to provide a signal representative of the acoustic waves.

Similarly, in order to define the Y axis, the Y transmitting transducer 24 is mounted on the top surface of the substrate 10. The transmitting transducer 24 generates acoustic waves that travel along the Y axis to an array 36 of reflective elements as described in detail below. The systems for the X and Y axis are similar. Each element of the reflective array 36 is disposed at about 45°, so as to reflect a portion of the waves incident thereto in the X direction to a corresponding reflective element disposed in a reflective array 34. The array 34 of reflective elements is disposed along an axis that is parallel to the axis along which the reflective array 36 is disposed. Each of the reflective elements in the array 34 is also disposed at an angle of about 45° with respect to the central axis of the array 34 so as to reflect acoustic waves propagating in the X direction from the reflective array 36 to the receiving transducer 20. The receiving transducer 20 is mounted in conventional manner to the top side of the substrate 10 perpendicular to the axis of the array 34 so as to sense energy reflected thereto by the array 34 to provide a signal representative of the acoustic waves.

The reflective elements in the arrays 28 and 30 define characteristic path lengths along the axis of the substrate, such that acoustic waves reflected by each successive element in the array 28 follow paths to the receiving transducer 22 that are progressively longer, e.g., having a larger characteristic time delay. Portions of each of the paths defined by the reflective arrays 28 and 30 extend in parallel across the substrate 10 in the Y direction, each parallel path portion defining an X coordinate. Similarly, the reflective elements in the arrays 36 and 34 define a set of paths of differing lengths such that acoustic waves reflected by each successive element in the array 36 follow paths to the receiving transducer 20 that are progressively longer. Portions of each of the paths defined by the arrays 36 and 34 extend in parallel across the substrate 10 in the X direction, each parallel path portion defining a Y coordinate.

Considering FIG. 3, it may be seen that the maximum path length from the transmitting transducer 18 to the receiving transducer 22 is the full length of the reflective array 28, the inside spacing between the reflective arrays 28 and 30 and the full length of the reflective array 30. Typically, this maximum path length is approximately from 20 to 40 inches.

For a maximum acoustic path length in the range of from 20 to 40 inches, and an attenuation (for Rayliegh waves in soda-lime glass) of approximately 1.5 dB/inch, the signal loss due to substrate attenuation is in the range of from 30 to 60 dB. Since the total attenuation for touch position sensors is typically in the range of 80 to 100 dB, the loss due to substrate attenuation is an appreciable percentage (approximately 50%) of this total value.

Consequently, if borosilicate glass, or some other transparent material with substantially less acoustic absorption than soda-lime glass, is used as the substrate 10 in place of soda-lime glass, it is possible to substantially increase the available signal received by the receiving transducer 22. In particular, when borosilicate glass is used in place of soda-lime glass, the data indicated above implies a 0.7 dB additional signal per inch. For a maximum acoustic path range of 20 to 40 inches, this implies 14 to 28 dB of additional signal. As indicated above, this additional signal amplitude provided by a borosilicate substrate makes possible a number of product enhancements that, by themselves, lead to undesirable losses in signal-to-noise ratio. These product enhancements will now be described.

FIGS. 4a, 4b and 4c illustrate, respectively, three types of transducers: a "wedge" transducer, a "flat" transducer and an "edge" transducer. Each of these transducers imparts acoustic wave energy to a touch panel with a certain coupling efficiency.

FIG. 4a shows a touch plate 10 utilizing a transducer 40 mounted on a wedge 42 that is in turn mounted on the touch surface of the substrate 10. The transducer vibrates to produce a compressional bulk wave that propagates in the wedge to impart an acoustic wave, i.e. a wave having vertical and longitudinal components, in the touch plate. The wedge extends above the plate, and therefore the rear or inactive side of the substrate and its edges remain free of circuitry or critical elements. Further, the area of the substrate in which the wave energy is in the form of Rayleigh (more particularly, quasi-Rayleigh) mode waves is insensitive to mounting on the opposite, inactive surface. Coupling wedges are typically made of plastic, and mounted to the glass substrate. The transducer is then bonded to the wedge and the wedge then bonded to the touch panel.

FIG. 4b shows a touch panel 10 utilizing a flat transducer 44 placed directly on the substrate surface. The transducer 44 imparts an acoustic wave, i.e., a compression wave, in the touch panel. The transducer, which may comprise interdigital metal electrodes, is applied by conventional metal deposition techniques to the substrate surface.

FIG. 4c illustrates the application of an edge transducer, that is, a piezo-electric transducer 46 mounted directly on one edge of the substrate 10. This transducer vibrates to impart an acoustic wave, e.g., a horizontally polarized transverse wave, in the touch panel.

Because of the extra "budget" of received signals available due to the use of a low loss transparent material, such as borosilicate glass, for the substrate according to the invention, it is possible to select transducers which are best suited to the particular touch sensor application. It is also possible to reduce the size and profile of the transducers from what would otherwise be required.

In a preferred embodiment of the present invention, wedge transducer, utilized as a transmitting transducer, bonded to the substrate surface with a bonding footprint which is narrower than four wavelengths of the acoustic waves.

Figure 5:
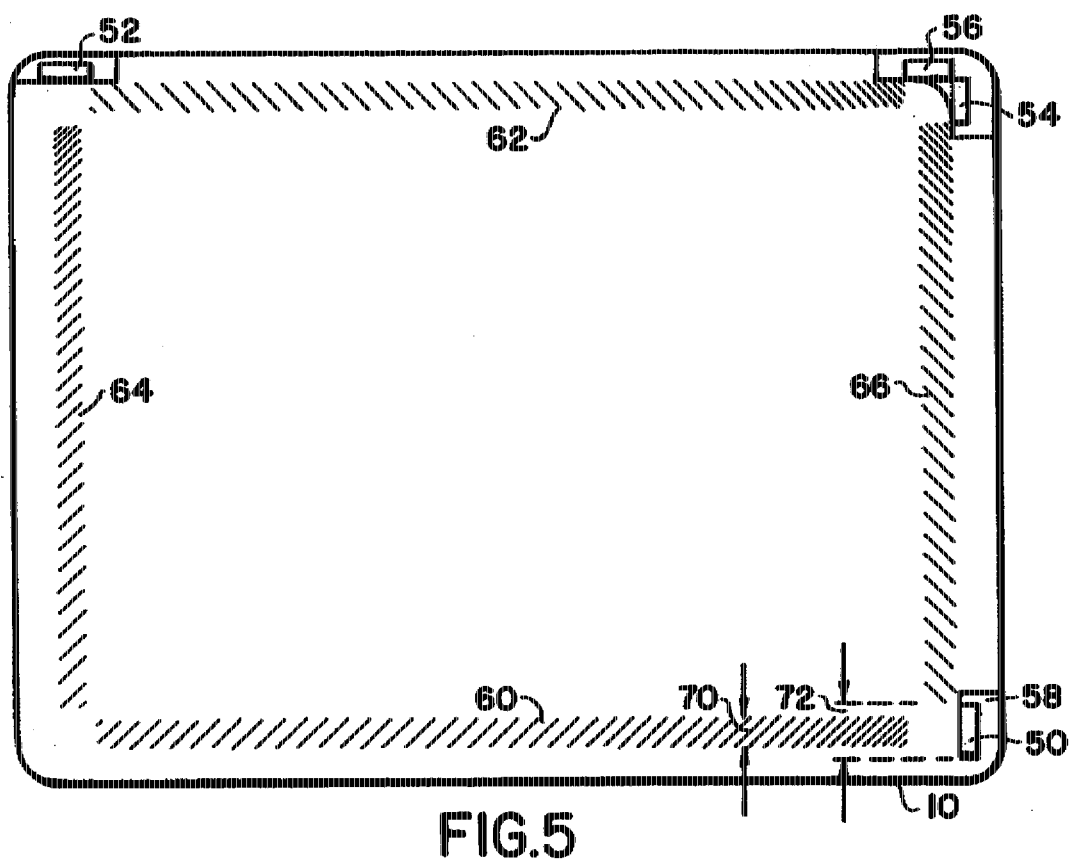
FIG. 5 is a top view of a preferred embodiment of a touchscreen according to the present invention.

FIG. 5 shows the preferred embodiment of the touch position sensor in detail. In this embodiment, the transmitting transducers 50 and 52 as well as the receiving transducers 54 and 56 are edge transducers which have been applied to the substrate 10 in respective cut-out regions (e.g., region 58 in the case of transducer 50). Due to the signal budget afforded by the present invention, the reflective arrays both in the direction 60 and 62 and the direction 64 and 66 may be made relatively narrow. In the preferred embodiment, the width 70, which is identical for all arrays, is made less than the beam width 72 of the acoustic waves produced by the transmitting transducers 50 and 52.

Sensors described above may be designed to function with commercially available acoustic-touchscreen electronics such as those sold by Elo TouchSystems. The basic operation of this type of touchscreen electronics can be understood by referring to FIG. 6. The control system of the touch position sensor as shown in FIG. 6 controls the application of the drive signals to the transducers 18 and 22 and determines the coordinates of a touch on the substrate 10 from the times of occurrence $t_{tx}$ and $t_{ty}$ of the signal perturbations representing the touch. The touch panel as shown in FIG. 5 is comprised of the substrate 10, the X and Y transmitting transducers 50 and 52, the X and Y receiving transducers 54 and 56 and the reflective arrays 60, 62, 64 and 66. A host computer 76, that may include a microprocessor or the like, initiates a scan cycle of the touch panel by instructing a controller 74. The controller 74 is responsive to an initiate scan cycle instruction from the computer 76 to apply a drive signal to the X axis transmitting transducer 50 through an X driver 76. The timing of the controller 74 is determined by a clock/oscillator 78. The drive signal applied to the transducer 50 is a burst drive signal in the form of a sine wave, the number of cycles of which is equal to the width of the array 60 divided by a constant. Suitable drive circuits are also described in U.S. Pat. Nos. 4,644,100 and Re. 33,151, which are expressly incorporated herein by reference. The controller 74 also sets an X/Y switch 80 to the X position to couple the X receiving transducer 54 to an R.F. amplifier 82. As the acoustic waves reflected by the arrays 60 and 62 are sensed by the receiving transducer 54, the transducer 54 generates an X axis signal representative thereof that is coupled to the amplifier 82 through the switch 80. The amplified X axis signal output from the amplifier 82 is applied to a demodulator 84 that removes the alternating component from the amplified X axis signal to provide an envelope waveform. The output of the demodulator 84 is coupled to a threshold device 86 that provides an output signal which follows the input if the input to the device 86 is above the threshold thereof. The output of the threshold device 86 does not, however, follow the input signal if the input is below the threshold thereof. The output of the threshold device 86 is applied to an analog to digital converter 88 the output of which is coupled by a buffer 90 to an internal bus 91. The controller 74 stores the digital data output from the A/D converter 88 in a static RAM 92 such that a value representing the amplitude of the X axis signal at each point in time, as sampled by the A/D converter 88, is stored in a location in the static RAM 9 representing the point in time.

After the X axis data is stored in the static RAM 92, the controller 74 controls the Y driver 76 to apply a burst drive signal to the Y axis transmitting transducer 22 of the touch panel 70. The controller 74 also changes the state of the X/Y switch 80 so that the Y receiving transducer 24 is coupled to the R.F. amplifier 82. The digital data representing the Y axis signal as output from the A/D converter 88 is likewise stored in the static RAM 92 such that a value representing the amplitude of the Y axis signal at each point in time, as sampled by the A/D converter 88, is stored in a location in the static RAM representing the point in time.

During an initialization process, the host computer 76 is responsive to the values stored in the static RAM 92 for an untouched panel to set the gain on the R.F. amplifier 82 via a buffer 94 and D/A converter 96. The threshold device 86 in combination with the automatic gain control provided by the feedback loop 98 shifts the zero level of the baseband response to increase the difference in amplitude of the transducer's output signal representing a touched point and an untouched point so that a touched point may be more easily detected.

Because of the increased signal budget which is available according to the present invention, it is possible to reduce the burst amplitude produced by the XY drivers 76 to transistor-transistor logic (TTL) voltage levels. This makes it possible to provide transistor-transistor logic at the output stage and thus leads to significant reductions in cost.

Figure 7:
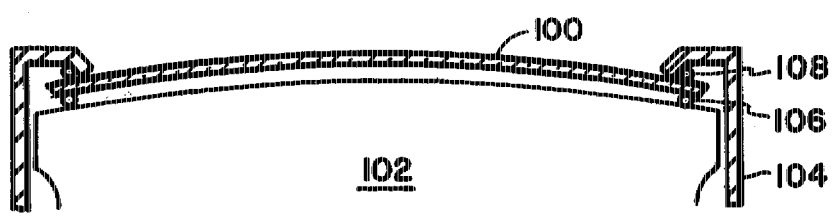
FIG. 7 is a cross sectional view of a touchscreen mounted on a CRT screen.

FIG. 7 illustrates how a touchscreen 100 may be affixed to the faceplate of a cathode tube 102. The touchscreen 100 and CRT 102 are constrained within a CRT housing 104.

The touchscreen 100 is spaced from, and follows the curved profile of the CRT faceplate. It is by means of a circumferencial resilient seal 106 and spaced from the edge of the housing 104 by a circumferencial seal 108. The seals 106 and 108 are in contact with the surfaces of the touchscreen 100 and absorb acoustic wave energy. Due to the increased signal budget afforded by the present invention, the seals 106 and 108 can cause an acoustic wave energy loss of at least 6 dB, and even up to 12 dB, without reducing the signal-to-noise ratio to unintelligible levels.

Increasing the touchscreen size, in particular the diagonal dimension of the glass substrate, also reduces the signal-to-noise ratio. For example, 1.6 dB/inch of attenuation implies that increasing the diagonal dimension of the glass by three inches will reduce the signal amplitude by about 10 dB, assuming a 3:4 aspect ratio for the touchscreen (maximum acoustic path length=constant+twice the X array length+the inside spacing between the X arrays).

Figure 8:
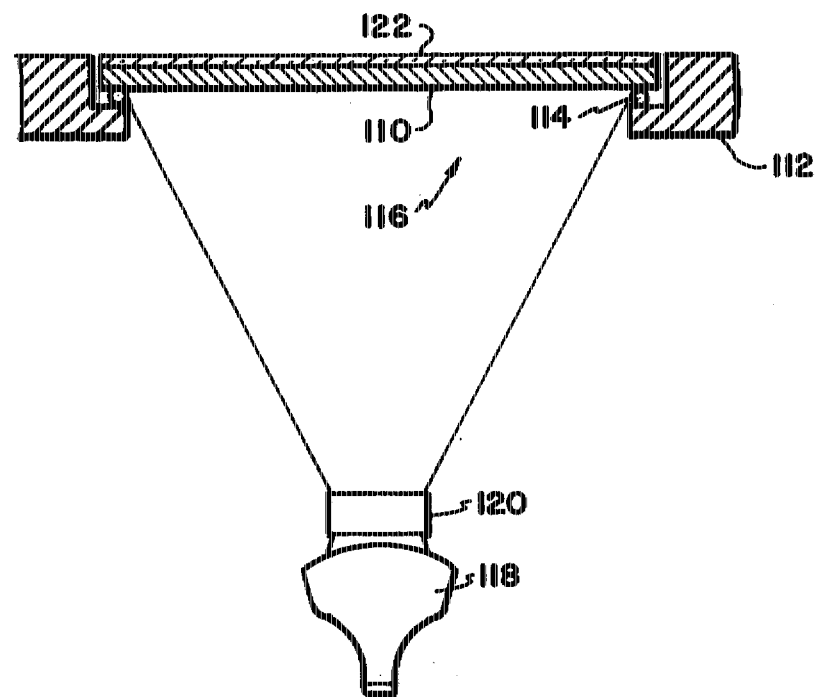
FIG. 8 is a cross sectional view of a touchscreen employed to receive a projected image.

With the extra signal budget afforded by the present invention, the diagonal dimension of the substrate can be increased to a size greater than 21 inches. FIG. 8 illustrates a large touchscreen 110 utilized in a projected image configuration. In this case, the touchscreen 110 is disposed in a housing 112 or table top, with an edge seal 114. The bottom surface 116 of the glass is frosted to display an image projected from a CRT 118 and lens 120, or some other image projection device. The top surface of the touchscreen 110 is provided with an optical coating 122 to substantially eliminate reflection. The optical coating may be a layer of plastic, for example. Although such a layer absorbs some acoustic wave energy, such absorption is permissible with sufficient signal budget.

Figure 9:
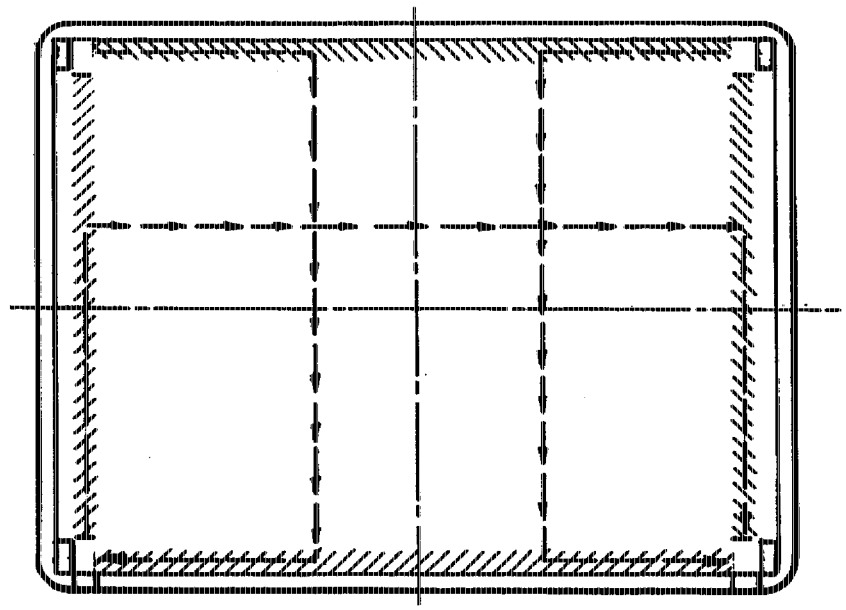
FIG. 9 is a top view of another preferred embodiment of a touchscreen according to the present invention.
Figure 10:
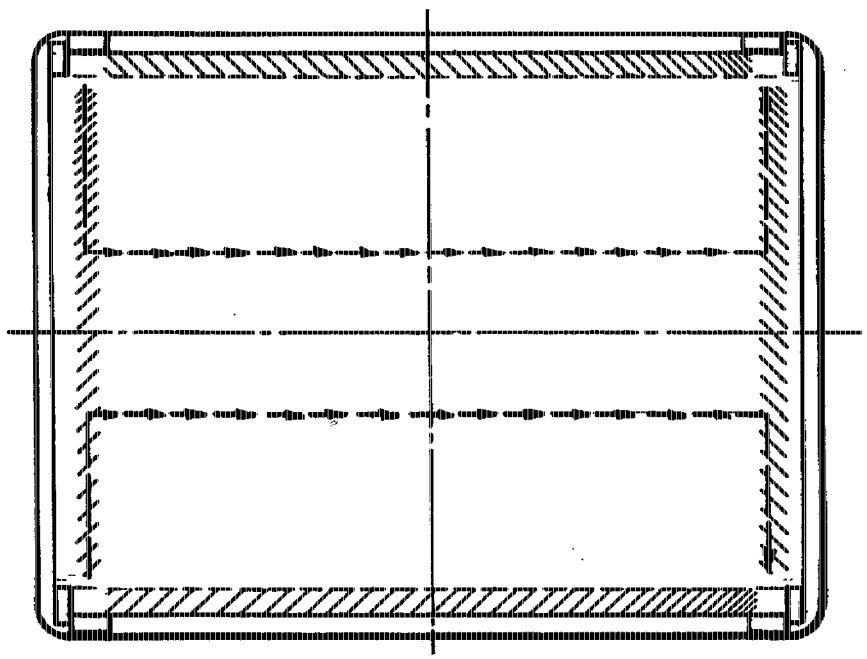
FIG. 10 is a top view of still another preferred embodiment of a touchscreen according to the present invention.

FIGS. 9 and 10 illustrate touchscreen sensors of the type shown in FIG. 5 with six and eight transducers, respectively. The use of six transducers permits an increase in the horizontal dimension of the touchscreen since the maximum path length is substantially reduced. The use of eight transducers permits an increase in both the horizontal and vertical dimension of the touchscreen.

There has thus been shown and described a novel acoustic touch position sensor using a low-loss transparent substrate which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a touch sensor comprising:
a substrate capable of propagating acoustic waves along a plurality of acoustic paths and having at least one touch-sensitive surface, a touch on said surface causing a perturbation of said acoustic waves;
at least one transmitting transducer coupled to said substrate for producing acoustic waves therein; and
means coupled to said substrate for sensing a touch-induced perturbation of said acoustic waves;
wherein Rayleigh waves are propagated along at least a portion of said acoustic paths;
the improvement wherein a touch-induced pertubation of Rayleigh waves is sensed by said sensing means and said substrate is made of a glass selected from the group consisting of a borosilicate glass and a barium-containing glass.

2. The touch sensor according to claim 1, wherein said means for sensing a touch-induced perturbation comprises means for determining the position of a touch on said surface.

3. The touch sensor according to claim 2, wherein said acoustic waves traverse an area of said substrate having a plurality of regions, said regions each having a characteristic period of delay in the time of traverse of said waves, a touch on said surface in a given region perturbing said acoustic waves at said characteristic delay period, and wherein said means for sensing touch-induced perturbation comprises means for determining said delay period.

4. The touch sensor according to claim 3, wherein said means for sensing touch induced perturbation includes at least one receiving transducer coupled to said substrate for producing electrical signals in response to the receipt of said acoustic waves.

5. The touch sensor according to claim 4, wherein said means for sensing touch induced perturbation includes electronic analyzer means, coupled to said receiving transducer, for processing said electrical signals to determine said touch position on said sensor.

6. The touch sensor according to claim 1, further comprising an electronic controller having an electronic driver means, coupled to said transmitting transducer, for producing an electrical oscillating signal burst to activate said transmitting transducer.

7. The touch sensor according to claim 6, wherein said electronic driver means includes a TTL output stage.

8. The touch sensor according to claim 3, further comprising means arranged on said substrate for diverting said acoustic waves produced by a single transmitting transducer into a plurality of paths extending across said plurality of regions.

9. The touch sensor according to claim 8, wherein said diverting means comprises at least one first linear array of diverting elements for diverting acoustic waves at an angle of about 90° with respect to the axis of propagation thereof as produced by said single transmitting transducer, said first linear array having a central axis substantially aligned with said axis of propagation.

10. The touch sensor according to claim 9, wherein said substrate is generally rectangular in shape, in face view, and has four substantially straight edges, and wherein said first array is disposed on said surface with its central axis substantially parallel and adjacent to an edge of said substrate.

11. The touch sensor according to claim 10, wherein said transmitting transducer produces acoustic waves with a prescribed beam width and wherein said first array has a width which is less than one half of said beam width.

12. The touch sensor according to claim 9, wherein said diverting elements of said first array are reflective elements.

13. The touch sensor according to claim 10, further comprising at least one second linear array of diverting elements disposed on said surface and having a central axis substantially parallel and adjacent to an edge of said substrate which is opposite to the edge adjacent to said first array, said second array diverting said acoustic waves at an angle of about 90° with respect to the direction of propagation thereof as determined by said first array.

14. The touch sensor according to claim 13, wherein said transmitting transducer produces acoustic waves with a prescribed beam width and wherein said second array has a width which is less than one half of said beam width.

15. The touch sensor according to claim 13, wherein said diverting elements of said second array are reflective elements.

16. The touch sensor according to claim 1, wherein said substrate is generally rectangular in shape, in face view, and has four substantially straight edges, the diagonal dimension of said substrate being greater than 21 inches.

17. The touch sensor according to claim 9, wherein said diverting elements of said first array convert acoustic energy in one type of acoustic wave to acoustic energy in another type of acoustic wave.

18. The touch sensor according to claim 1, wherein said transmitting transducer produces Rayleigh waves.

19. The touch sensor according to claim 1, wherein said transmitting transducer produces Lamb waves.

20. The touch sensor according to claim 1, wherein said transmitting transducer produces shear waves.

21. The touch sensor according to claim 13, wherein said diverting elements of said second array convert acoustic energy in one type of acoustic wave to acoustic energy in another type of acoustic wave.

22. The touch sensor according to claim 4, wherein said receiving transducer receives Rayleigh waves.

23. The touch sensor according to claim 4, wherein said receiving transducer receives Lamb waves.

24. The touch sensor according to claim 4, wherein said receiving transducer receives shear waves.

25. The touch sensor according to claim 1, wherein said transmitting transducer is a wedge transducer bonded to said substrate surface with a bonding footprint, said bonding footprint on said substrate being narrower than four wavelengths of said acoustic waves.

26. The touch sensor according to claim 2, wherein said means for sensing a touch induced perturbation includes at least one receiving transducer coupled to said substrate for producing electrical signals in response to the receipt of said acoustic waves.

27. The touch tensor according to claim 26, wherein at least one of said transmitting transducer and said receiving transducer is a wedge transducer arranged on said substrate surface.

28. The touch sensor according to claim 27, wherein all of said transducers are wedge transducers arranged on said substrate surface.

29. The touch sensor according to claim 26, wherein at least one of said transmitting transducer and said receiving transducer is a flat transducer arranged on said substrate surface.

30. The touch sensor according to claim 29, wherein all of said transducers are flat transducers arranged on said substrate surface.

31. The touch sensor according to claim 26, wherein at least one of said transmitting transducer and said receiving transducer is an edge transducer arranged on an edge of said substrate.

32. The touch sensor according to claim 31, wherein all of said transducers are edge transducers arranged on an edge of said substrate.

33. The touch sensor according to claim 1, wherein said substrate has an outer edge and wherein said sensor further comprises a seal disposed in contact with said surface adjacent said outer edge.

34. The touch sensor according to claim 33, wherein said seal causes an acoustic wave energy loss of at least 6 dB.

35. The touch sensor according to claim 34, wherein said seal causes an acoustic wave energy loss of at least 12 dB.

36. A touch sensor according to claim 1, wherein said substrate has an optical coating on said surface to substantially eliminate reflection.

37. A touch sensor according to claim 36, wherein said optical coating is a layer of plastic.

38. A touch sensor according to claim 1, wherein said substrate is frosted.

39. A touch sensor according to claim 1, wherein said substrate is curved in profile.

40. A touch sensor according to claim 13, having two transmitting transducers, one for each axis, and two receiving transducers, one for each axis.

41. A touch sensor according to claim 13, having three transmitting transducers, two for one axis, and one for the other axis, and three receiving transducers, two for said one axis and one for said other axis.

42. A touch sensor according to claim 1, having four transmitting transducers, two for one axis, and two for the other axis, and four receiving transducers, two for said one axis, and two for said other axis.

43. A touch sensor according to claim 1, further comprising a table top, and wherein said substrate forms a surface portion of said table top.

44. A touch sensor according to claim 43, wherein said substrate is frosted and further comprising means for projecting an image onto said substrate.

45. A touch sensor according to claim 38, further comprising means for projecting an image onto said substrate.

* * * * *